H. E. BURKET.
RECTIFIER SYSTEM.
APPLICATION FILED MAR. 29, 1917.
1,327,521.
Patented Jan. 6, 1920.
2 SHEETS—SHEET 1.
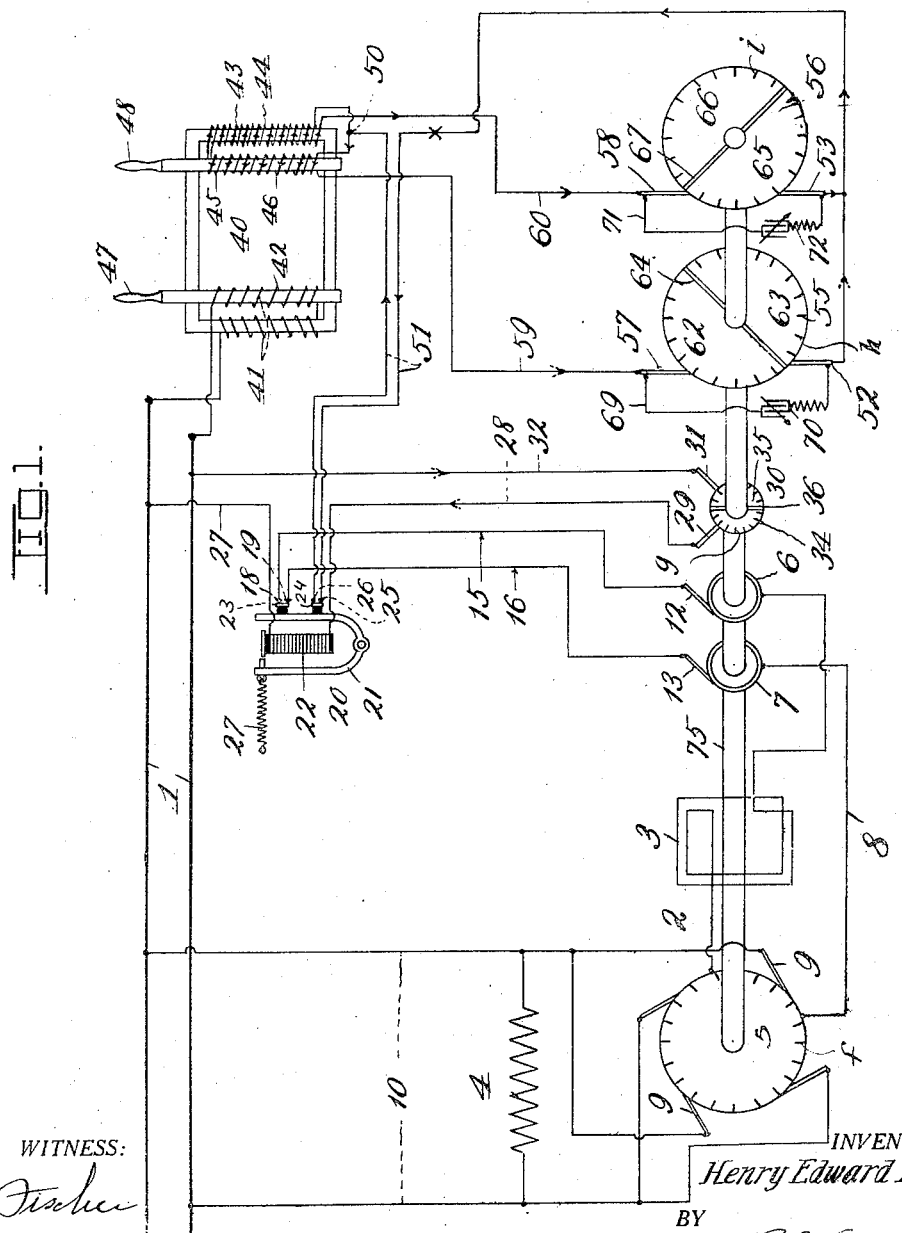
WITNESS:
INVENTOR:
Henry Edward Burket,
BY
ATTORNEY.

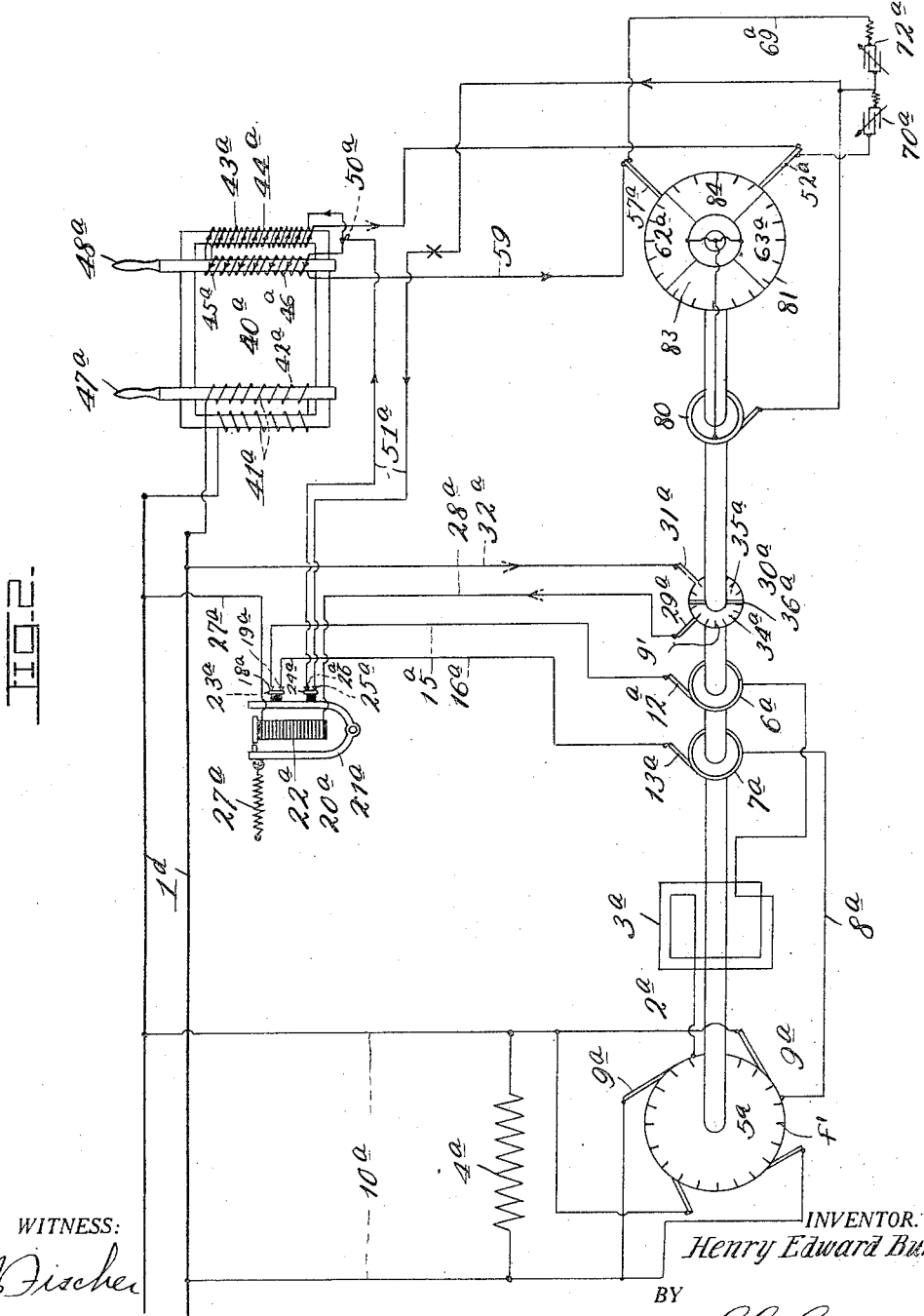

UNITED STATES PATENT OFFICE.

HENRY EDWARD BURKET, OF KANSAS CITY, MISSOURI.

RECTIFIER SYSTEM.

1,327,521. Specification of Letters Patent. Patented Jan. 6, 1920.

Application filed March 29, 1917. Serial No. 158,393.

*To all whom it may concern:*

Be it known that I, HENRY EDWARD BURKET, a citizen of the United States, residing at Kansas City, in the county of Jackson and State of Missouri, have invented certain new and useful Improvements in Rectifier Systems, of which the following is a specification.

My invention relates to new and useful improvements in mechanical rectifier systems for converting alternating electric currents of commercial voltage and frequency into direct currents, and one object is to provide a system having a higher efficiency than has been attained heretofore and in which kick-back on the main commutator or commutators is absent, by reason of the fact that the transformer of the system is always in circuit.

A further object is the provision of a transformer having a plurality of secondaries used in succession during a period of each complete cycle, in connection with the main commutators and a synchronous motor, making a three wire system in which the third or central lead supplies the direct current series circuit of the system.

A further object is the provision of one or more main commutators each having brushes so arranged that the commutator sectors successively fall out of the circuit during a period of each revolution, and thus automatically extinguish any arc that may form between said sectors.

A further object is the introduction into the system of a motor which is started and driven with the current flowing inwardly through its commutator. Upon reaching synchronism its secondary winding is short-circuited, thereby maintaining perfect synchronism and avoiding hunting, by reason of the damping effect of said short-circuited secondary winding.

A further object is the provision of an automatic switch which closes only when the current is in proper direction and opens should the current reverse from any cause, thereby eliminating all danger of damage to the system from such cause.

A further object is to provide a rectifier system which can be used to advantage in charging storage batteries, in supplying current to arc lamps used in motion picture projection machines, in supplying direct current to motors and spark coils, and in supplying electromagnets with direct current of a pulsating nature which is desirable in many cases, such for instance as energizing physicians' electromagnets, remagnetizing permanent magnets, increasing the frequency of the alternations of A. C. current, etc.

A further object is to provide a rectifier system wherewith storage batteries may be charged without danger of their discharging across the segments of the commutators. Such danger is overcome by the transformer windings through which any difference of potential would first have to pass, and the inductance of the transformer core and the lines of force therein. Thus a serious difficulty which has heretofore existed in other rectifiers is overcome.

Other objects of the invention will hereinafter appear, and in order that said invention may be fully understood, reference will now be made to the accompanying drawings, in which:

Figure 1 is a diagram of the preferred form of rectifier system.

Fig. 2 is a modified form of rectifier system.

Referring now in detail to the preferred form, 1 designates the main A. C. line, whereby current is supplied to the system.

2 designates a synchronous motor having a winding 3 on the rotor wound to produce two magnetic poles, or any multiple thereof in the motor armature. Said motor 2 also embodies a regular laminated field winding 4 with magnetic poles as above. The winding 3 has one terminal connected to one of the segments $f$ of the motor commutator 5 and the other terminal connected to a collector ring 6. Another segment of the commutator 5 is connected to a second collector ring 7 through a wire conductor 8. Brushes 9 spaced about the commutator 5 are connected to the A. C. line 1 by wire conductors 10 to supply the motor 2, with current which starts and operates said motor 2.

The collector rings 6 and 7 coact with brushes 12 and 13 connected to wire conductors 15 and 16, connected to contacts 18 and 19, respectively, of an automatic switch 20. Said automatic switch 20 embodies a pivoted permanent magnet 21 and an electromagnet 22, which latter is placed between the poles of the former. The permanent magnet 21 has an insulated bar 23 to close the contacts 18 and 19, and an insulated bar 24 to close contacts 25 and 26. A spring 27 normally holds the permanent magnet 21 in position to keep the contacts 18, 19, 25 and 26 open. One end of the winding of the electromagnet 22 is connected by a conductor 27 to one side of the A. C. line. The other end of said winding is connected by a conductor 28 to the brush 29 of a rectifying commutator 30. The opposite brush 31 of the commutator 30 is connected to a conductor 32 leading to the opposite side of the A. C. line 1 from that to which the conductor 26 is connected. The brushes 29 and 31 are arranged at an angle of 90 degrees to each other to fall out of circuit twice at each revolution of the commutator 30 and prevent sparking at said commutator. The rectifying commutator 30 is divided into two main segments 34 and 35 by insulation 36. This arrangement of the rectifying commutator 30 enables it to rectify the alternating current by using one-half of the complete cycles or impulses in one direction only and hence the polarity will always bear a definite relation to the polarity of the direct service current. The commutator 30 is also divided into minor segments $g$ by fiber strips to prevent rapid wear of the peripheral surface of said commutator.

40 designates a transformer having primary windings 41 and 42, and secondary windings 43, 44, 45 and 46. An adjustable core 47 extends through the primary winding 42 and a similar core 48 extends through the secondary windings 45 and 46. The secondary windings 45 and 46 are in opposition to the main secondary windings 43 and 44, and in operation oppose said main windings 43 and 44 when the core 48 is moved into the coils, which operation lowers the voltage. High voltage is immediately restored when the core 48 is retracted. On the primary side of the transformer the windings 41 and 42 are in the same direction. The voltage is reduced by advancing the core 47 in the coil 42, as the inductance is thereby increased and results in a diminished input and incidentally a diminished output.

The primary windings 41 and 42 are connected to the A. C. main 1, while the secondary windings 43, 44, 45 and 46 have a central connection 50 to one side of the D. C. service line 51, which connects with the contact points 25 and 26 of the automatic switch 20, or other suitable means for closing the circuit. The opposite side of the D. C. service line 51 connects with brushes 52 and 53 of two main rectifying commutators 55 and 56, having two other brushes 57 and 58 connected by wire conductors 59 and 60, respectively, to the opposite terminals of the secondary windings 43, 44, 45 and 46. The commutator 55 is divided into two main segments 62 and 63 by insulated metal sectors 64, and the commutator 56 is divided into two main segments 65 and 66 by insulated metal sectors 67. The brushes and the main segments of the respective commutators 55 and 56 are so disposed that current flows through only one set of brushes at a time and is always direct from or to the central connection 50, each pair of secondary windings being used alternately. The commutators 55 and 56 are also divided into minor segments $h$ and $i$, respectively, by fiber strips.

The set of brushes 52 and 57 are connected by a wire conductor 69 containing an adjustable condenser 70 with inductance. Brushes 53 and 58 are connected through a wire conductor 71 and an adjustable condenser 72 with inductance. The commutator 30 and the commutators 55 and 56 may be all mounted upon the motor shaft 75, or upon a separate shaft connected to said motor shaft in such manner that they will rotate in proper relation to the frequency of the alternating current.

In practice, after the motor 2 has started it operates as any alternating current motor, but on reaching synchronism the circuit is closed to the collector rings 6 and 7. The motor then operates in perfect synchronism by reason of the fact that its armature winding 3 is short-circuited, causing the current in the motor to be of a very sharp wave form, which in turn causes said motor to run in more perfect synchronism than in systems heretofore employed. Rotation of the motor shaft drives the commutators 55 and 56, the main segments and the brushes of which are so disposed that during part of each revolution a main segment of each is entirely out of circuit, thus eliminating any sparking that might otherwise occur. The brushes 57 and 58 are so disposed with relation to the brushes 52 and 53, respectively, as to alternately close the circuit 59 or 60 at, or before, the neutral point in the alternations. However, the opposite circuit is opened at the proper time namely: zero. The effect of the sudden closing of the circuit at the brush 57 or the brush 58 is to cause a momentary fluctuation in the magnetism of the transformer 40, thus tending to lessen the current of the opposite circuit of the secondary windings 44 and 45 or 43 and 46, and thereby avoiding any sparking at the brushes and insuring covering the neutral points in the cycles and effectually eliminating absolute zero of the current on the D. C. line. The adjustable condensers and inductances 70 and 72 also coact in overcoming sparking at the brushes by absorbing the kick-back current at these points. Said condensers and inductances also coact in eliminating absolute zero of the current on the D. C. line by supplying current thereto at the point of zero in the alternations, which has been supplied to the condensers and inductances upon the opening of the circuit at the brushes bearing on the commutators 55' or 56. By reason of the variable inductance it will be possible to correctly attune the condenser circuit to obtain the best results, as it has been found that increasing the inductance in series with the condenser lessens the effective capacity of the condenser circuit.

The circuits may be traced as follows: Alternating current from the mains 1, enters the motor circuit over conductors 10 and starts and drives the motor 2 which in turn drives the collector rings 6 and 7, and the rectifiers 35, 55 and 56. As soon as the motor attains synchronism the alternating current passing from the mains 1 through the conductors 28 and 32, the brushes 29 and 31, and the rectifier 30, energizes the switch coil 22 which attracts the permanent magnet 21 and causes it to bridge the contacts 18, 19, 25 and 26. Closing of the contacts 18 and 19 establishes a circuit from the commutator $f$ of the motor 2 through the winding 3, collector ring 6, the brush 12, conductor 15, contact 23, conductor 16, brush 13, collector ring 7, and the conductor 8.

Closing of the contacts 25 and 26 closes the service circuit through the transformer 40, conductor 60, brush 58, the rectifier 56, the brush 53, the conductors 51 and the contact 24, and returns to the transformer through the neutral point 50. In its passage through the conductor 60 a portion of the current is shunted through the conductor 71 and the condenser 72.

When one of the insulator sectors 67 passes between the brushes 58 and 53, the conductor 60 is cut out and the current enters the load circuit 51 from the transformer 40 over the conductor 59, brush 57, one of the main segments of the rectifier 55, the brush 52, the load circuit 51 and the contact 24 and returns to the transformer 40 through the neutral point 50. A portion of the current passing through the conductor 59 is shunted around the rectifier 55 through the conductor 69 and the condenser 70. From the foregoing it will be understood that the alternating current flows through only one set of main brushes at a time and in but one direction to the service circuit 51.

The commutator 30 rectifies the current passing to the switch coil 22 by utilizing only the alternating impulses entering over the conductor 32, and as said impulses bear a definite relation to the direct service current in respect to polarity the switch closes on the proper impulse and thus avoids a reversal of polarity in the direct service circuit.

In the modified form, Fig. 2, the collector ring 80 is connected to the central connection 50$^a$, of the transformer windings 43$^a$, 44$^a$, 45$^a$, and 46$^a$, through the D. C. service line 51$^a$. The opposite terminals of said windings are connected to the brushes on the main commutator 81, which has two active segments 62$^a$ and 63$^a$, and also two inactive segments 83 and 84. This arrangement alternately connects the respective brushes to the collector ring 80, and thus utilizes both waves of the alternations. Hence, the direction of the current in the circuit leading from the transformer 40$^a$ to the collector ring 80 is always direct.

A further advantage of the foregoing is that it provides a means for automatically putting out any arc that may form between the segments of the main commutator 81, by reason of said segments successively falling out of circuit and as no difference of potential remains between the active segments 62$^a$ and 63$^a$ and the inactive segments 83 and 84, any arc is extinguished.

Another advantage is that the collector ring 80 can be made small in diameter which results in lower peripheral speed and better contact of the brushes. This also causes less drag on the motor, thereby securing higher efficiency. Furthermore, as the inactive segments on the main permutator are used successively, and the brushes carry the current alternately, it follows that less heating will occur than with former methods.

Other parts of the modified form are similar to the preferred as indicated by like reference numerals with exponents, hence further description of said modified form is deemed unnecessary.

Having thus described my invention, what I claim and desire to secure by Letters Patent, is:

1. In an alternating current rectifying system, a synchronous motor, a rectifying commutator driven by said motor and provided with active and inactive sectors, brushes disposed about said sectors, a condenser and a reactance shunted around said brushes, a transformer having secondary windings connected to certain of the brushes and primary windings connected to the alternating current mains adjustable cores in said windings, and a direct current circuit connected to certain of the brushes and a neutral point of the secondary windings.

2. In an alternating current rectifying system, a synchronous motor, two rectifying commutators driven by said motor, each consisting of two active sectors separated by a comparatively narrow inactive sector, the inactive sector of one commutator being arranged at an angle of ninety degrees relative to the inactive sector of the companion commutator, a pair of brushes for each commutator of the same relative width as its inactive sector and so disposed as to simultaneously bear against each active sector during a portion of its revolution, a transformer having secondary windings connected to certain of the brushes and primary windings connected to the alternating current mains, adjustable cores in said windings, a direct current circuit connected to the other brushes and a neutral point of the secondary windings, and an automatic switch excited by the main alternating current to close the direct current circuit and adapted to open said direct current circuit should the main alternating current be interrupted.

3. In an alternating current rectifying system, a rotary rectifying commutator having a plurality of active and inactive sectors, two brushes bearing on said commutator and spaced apart to simultaneously contact each active sector during a portion of each revolution thereof, means for conducting an alternating current to one of said brushes, a direct current service circuit connected to the other brush, an electrostatic accumulator connected to the brushes, a conductor shunted around the commutator and in circuit with the alternating current and direct current conductors, an adjustable condenser with inductance in circuit with said shunt conductor, an automatic switch to open and close the service circuit, and means for conducting a direct current to said switch to close the same.

4. In an alternating current rectifying system, a rotary rectifying commutator having a plurality of active and inactive sectors, two brushes bearing on said commutator and spaced apart to simultaneously contact each active sector during a portion of each revolution thereof, means for conducting an alternating current to one of said brushes, a direct current service circuit connected to the other brush, an electrostatic accumulator connected to the brushes, a second rectifying commutator mounted to rotate with the first one and having a plurality of active and inactive sectors arranged at ninety degrees to the similar elements of the first commutator, a brush bearing on said second commutator and supplied with alternating current, and another brush bearing on the second commutator and connected to the service circuit.

5. In an alternating current rectifying system, a rotary rectifying commutator having a plurality of active and inactive sectors, two brushes bearing on said commutator and spaced apart to simultaneously contact each active sector during a portion of each revolution thereof, means for conducting an alternating current to one of said brushes, a direct current service circuit connected to the other brush, an electrostatic accumulator connected to the brushes, a second rectifying commutator mounted to rotate with the first one and having a plurality of active and inactive sectors arranged at ninety degrees to the similar elements of the first commutator, a brush bearing on said second commutator and supplied with alternating current, another brush bearing on the second commutator and connected to the service circuit, and electrostatic accumulators shunted around the respective commutators and in circuit with the alternating current and direct current conductors.

6. In an alternating current rectifying system, two rotary rectifying commutators, each consisting of two active sectors separated by inactive sectors, a pair of brushes coacting with each commutator, an alternating current conductor leading to one of each pair of brushes, a direct current service circuit leading from each of the other brushes to a neutral point, secondary windings connected to said neutral point and the alternating current conductors, and primary windings associated with said secondary windings and connected to a source of alternating current.

7. In an alternating current rectifying system, two rotary rectifying commutators, each consisting of two active sectors separated by inactive sectors, a pair of brushes coacting with each commutator, an alternating current conductor leading to one of each pair of brushes, a direct current service circuit leading from each of the other brushes to a neutral point, secondary windings connected to said neutral point and the alternating current conductors, primary windings associated with said secondary windings and connected to a source of alternating current, an automatic switch for opening and closing said service circuit and embodying an actuating magnet, a third rectifying commutator mounted to rotate with the two above-mentioned brushes, bearing on said third rectifying commutator, a conductor leading to one of said brushes from the source of alternating current, a conductor leading from the other brush to the magnet coil to energize the same, and a conductor leading from said magnet coil to the source of alternating current.

8. In an alternating current rectifying system, two rotary rectifying commutators, each consisting of two active sectors separated by inactive sectors, a pair of brushes coacting with each commutator, an alternating current conductor leading to one of each pair of brushes, a direct current service circuit leading from each of the other brushes to a neutral point, secondary windings connected to said neutral point and the alternating current conductors, primary windings associated with said secondary windings and connected to a source of alternating current, an automatic switch for opening and closing said service circuit and embodying an actuating magnet, a third rectifying commutator mounted to rotate with the two above-mentioned brushes, bearing on said third rectifying commutator, a conductor leading to one of said brushes from the source of alternating current, a conductor leading from the other brush to the magnet coil to energize the same, a conductor leading from said magnet coil to the source of alternating current, a pair of collector rings mounted to rotate with the rectifying commutators, a synchronous motor for driving the collector rings and the rectifying commutators, conductors connecting said collector rings and the motor commutator, brushes bearing on the collector rings, and conductors connecting said brushes with contacts closed by the automatic switch when the magnet coil thereof is energized.

In testimony whereof I affix my signature in the presence of two witnesses.

HENRY EDWARD BURKET.

Witnesses:
F. G. FISCHER,
GEO. B. MITCHELL.